United States Patent
Waseda (10) Patent No.: US 7,270,484 B2
(45) Date of Patent: Sep. 18, 2007

(54) SPLIT OUTER RACE, SPLIT ROLLING BEARING USING SAME, AND MANUFACTURING METHOD FOR SPLIT OUTER RACE

(75) Inventor: Yoshitaka Waseda, Aichi (JP)

(73) Assignee: Koyo Seiko Co., Ltd., Osaka (JP)

( * ) Notice: Subject to any disclaimer, the term of this patent is extended or adjusted under 35 U.S.C. 154(b) by 177 days.

(21) Appl. No.: 11/136,482

(22) Filed: May 25, 2005

(65) Prior Publication Data

US 2005/0265644 A1    Dec. 1, 2005

(30) Foreign Application Priority Data

May 26, 2004   (JP)   ............ P.2004-155848

(51) Int. Cl.
*F16C 33/60*   (2006.01)
(52) U.S. Cl. ............................................. 384/570
(58) Field of Classification Search ............... 384/570, 384/569, 571, 273, 272
See application file for complete search history.

(56) References Cited

FOREIGN PATENT DOCUMENTS

| JP | 7-317778 | 12/1995 |
| JP | 63-29129 | 6/1998 |
| JP | 2002-206543 | 7/2002 |
| JP | 2003-314563 | 11/2003 |

*Primary Examiner*—Lenard A. Footland
(74) *Attorney, Agent, or Firm*—McGinn IP Law Group, PLLC

(57) ABSTRACT

The present invention provides a split outer race for use in a rolling bearing. The split outer race is formed by bending a strip-shaped metallic plate into a substantially semicircle shape. At least one end of the split outer race in a circumferential direction has a concave-and-convex shape including a first slope portion which is inclined to an axial direction and a second slope portion inclined in a direction opposite to a direction in which the first slope portion is inclined. An edge portion formed on an inner surface of the one end in the circumferential direction has a round shape.

4 Claims, 11 Drawing Sheets

SPLIT OUTER RACE, SPLIT ROLLING BEARING USING SAME, AND MANUFACTURING METHOD FOR SPLIT OUTER RACE

BACKGROUND OF THE INVENTION

The present invention relates to a split outer race, to a split rolling bearing using the split outer race, and to a manufacturing method for a split outer race. This split rolling bearing is used in a structure using a shaft as an inner race member, for example, in a connection portion between a crankshaft of an automobile engine and a large end part of a connecting rod thereof.

For instance, a rolling bearing used in the connection portion between the crankshaft and the large end part of the connecting rod has paired split outer races, plural rollers circumscribed on the inner surfaces of the paired split outer races, and paired split cages for holding the rollers arranged in such a way as to be substantially equally spaced in a circumferential direction thereof. The split outer races are produced by using, for example, bearing steel to thereby manufacture a cylindrical outer race, and by thereafter splitting the cylindrical outer race into two. To split the cylindrical outer race into two, notches for inducing splitting are provided in a part of the cylindrical outer race. Then, the cylindrical outer face is split by applying an external force thereto by pressing (see, for instance, JP-A-7-317778).

However, at the splitting, most of cracks produced in the notches extend therefrom straightly along an axial direction. Thus, when a split rolling bearing using the split outer races is incorporated into the place of use, the paired split outer races are apt to be displaced in an axial direction. Additionally, a processing stress generated at the splitting causes both ends of each of the paired split outer races to open in the direction of an outside diameter. However, the degree of opening of each of the split outer races is not constant. When the paired split outer races are combined with each other, both ends of each of the split outer races are displaced in a radial direction, so that a step-like part due to a difference in inside diameter between the outer races is apt to be produced at an abutting portion at which both ends of one of the split outer races abut against the corresponding ends of the other split outer race. Thus, when the rolling bearing is in a used condition, the rollers, which roll on the inner surfaces of the paired split outer races, ride on the step-like portion, so that vibrations and noises are generated.

SUMMARY OF THE INVENTION

Problems that the invention is to solve are to suppress or prevent vibrations and noises from being generated when rollers roll on the inner surfaces of both split outer races that are attached in combination to the place of use thereof.

According to an aspect of the invention, there is provided a split outer race, which is shaped like a substantially semicircle, for use in a rolling bearing. This split outer race features that the split outer race is formed by bending a strip-shaped metallic plate like a substantially semicircle, that at least one end in a circumferential direction thereof has a concave-and-convex shape, including a first slope portion, which is inclined to a line extending along an axial direction, and a second slope portion inclined in a direction opposite to a direction in which the first slope portion is inclined, and that an edge portion provided on an inner surface of the one end in the circumferential direction thereof has a round shape.

According to the invention, in a case where the paired outer races are attached in combination, both ends in the circumferential direction of the split outer race substantially coincides with and are fitted to those in the circumferential direction of the split outer race, so that the split outer races are not deviated in the axial direction and in the radial direction from each other. Further, the end portion at the one end in the circumferential direction of each of the paired split outer races are slightly displaced in a radial direction and step-like portions each corresponding to a slight height difference are formed during the paired split outer races are attached to the place of use, the rollers abut against the rounded edge portion at both ends in the circumferential direction of the split outer races. Thus, an amount, by which the roller rides on the step-like portion, is reduced, so that the generation of vibrations and noises are suppressed.

Preferably, at least one convex part, which is projected in the circumferential direction, and at least one concave part, which is recessed in the circumferential direction, are provided and arranged in an axial direction in at least the one end in the circumferential direction. One of the first and second slope portions is a part extending from an apex portion of the convex part to a deepest portion of the concave part, and the other of the first and second slope portions is a part extending from the deepest portion of the concave part to a portion provided at a side opposite to the convex part.

Also, preferably, the convex part is projected in the circumferential direction so that a length of a circular arc of a cross-section of the single split outer race is longer than a circumference of the semicircle. A projected portion of the convex part is placed to an outside diameter side being outer than an outer surface of across-sectionally semicircular-shaped part. In this case, in a condition in which the paired split outer races are attached in combination to the place of use, the substantially straight portion provided at the side of the end of each of the large convex parts is elastically deformed according to the counterpart fitting surface. The elastic restoring force of this elastically deformed portion pushes each of both the split outer races closely against the counterpart fitting surface without any clearance therebetween. Consequently, the backlash of both the split outer races can be eliminated. Thus, the inner surfaces of both the split outer races are cross-sectionally substantially perfect-circle-shaped.

According to the invention, there is provided a split rolling bearing having paired split outer races, plural rollers circumscribed on inner surfaces of the paired split-outer races, and paired split cages for holding the rollers arranged in such a way as to be substantially equally spaced in a circumferential direction. This split rolling bearing features that the paired split outer races are the aforementioned split outer races.

According to another aspect of the invention, there is provided a method of manufacturing a split outer race, which is the aforementioned split outer race. The method of manufacturing a split outer race features that this method comprises the steps of forming a concave-and-convex shape having a first slope portion, which is inclined toward a transversal direction, and a second slope portion inclined to a direction opposite to the transversal direction, in which the first slope portion is inclined, as a shape of at least one end portion in a longitudinal direction of a strip-shaped metallic plate cut to a predetermined length, rounding an edge portion provided an inner surface of the one end portion in the longitudinal direction of the strip-shaped metallic plate, the inner surface serving as a raceway surface for the rollers, and bending the strip-shaped metallic plate like a substantially semicircle.

According to the invention, the shape of at least one end in the circumferential direction of the split outer race can easily be formed with high precision like a non-linear shape that does not cause an axial deviation when the two split outer races are combined with each other. Thus, manufacturing yield can be enhanced, while the cost can be reduced.

Preferably, the strip-shaped metallic plate is a hoop member. When the strip-shaped metallic plate is cut, the edge portion is rounded by a cutting tool. In this case, both sides of the hoop member have smooth surfaces without being abraded. The rollers smoothly roll on the inner surfaces obtained by curving the smooth surfaces. This is advantageous in suppressing the generation of vibrations and noises. Additionally, a cutting operation and a rounding operation can be performed at a time. Thus, the number of steps can be reduced. This contributes to the reduced cost.

The invention can suppress or prevent axial displacement and radial deviation from being generated when rollers roll on the inner surfaces of paired split outer races that are attached in combination to a suitable place of use thereof. Thus, the step-like parts provided on the inner peripheral surfaces (that is, raceway surfaces for rollers) of the paired split outer races can be reduced or eliminated. Consequently, the rollers come to be able to stably roll. Thus, the generation of vibrations and noises can be suppressed or prevented.

DETAILED DESCRIPTION OF PREFERRED EMBODIMENTS

Figure 1:
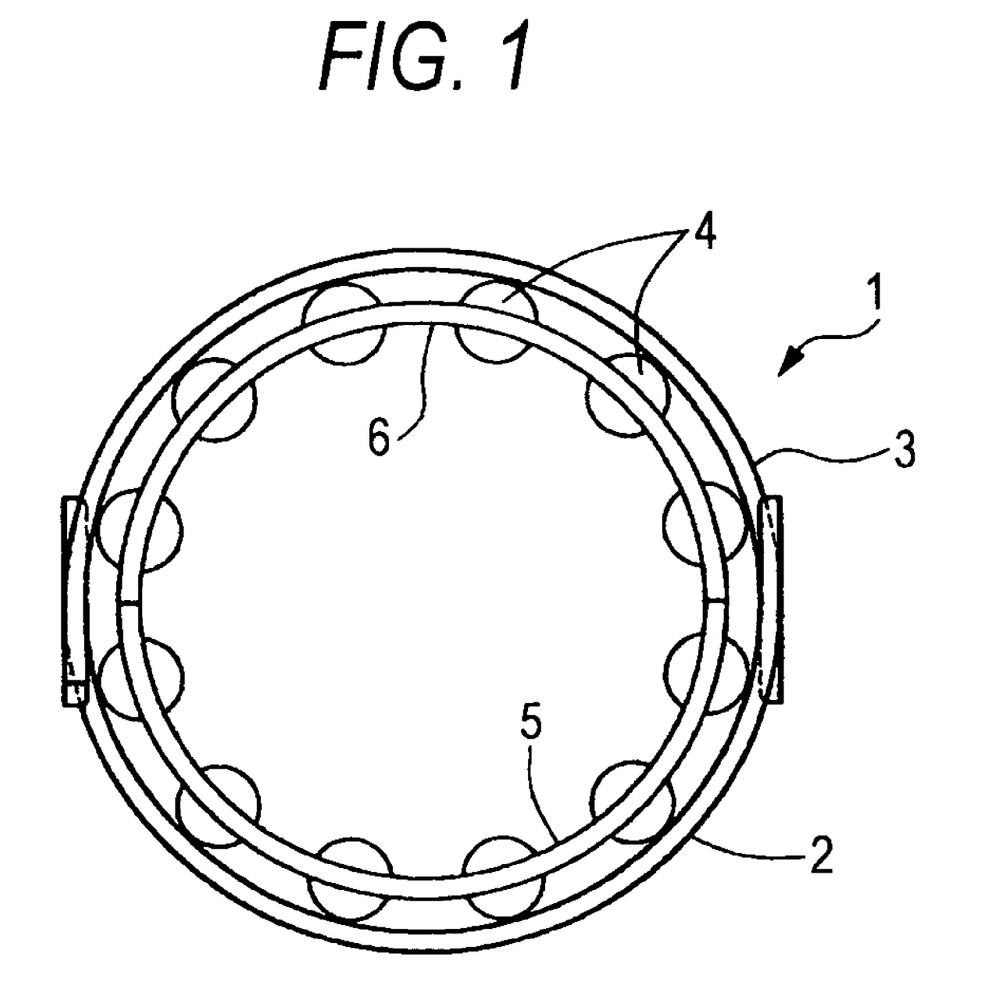
FIG. 1 is a side view illustrating a split rolling bearing according to a best mode for carrying out the invention.
Figure 2:
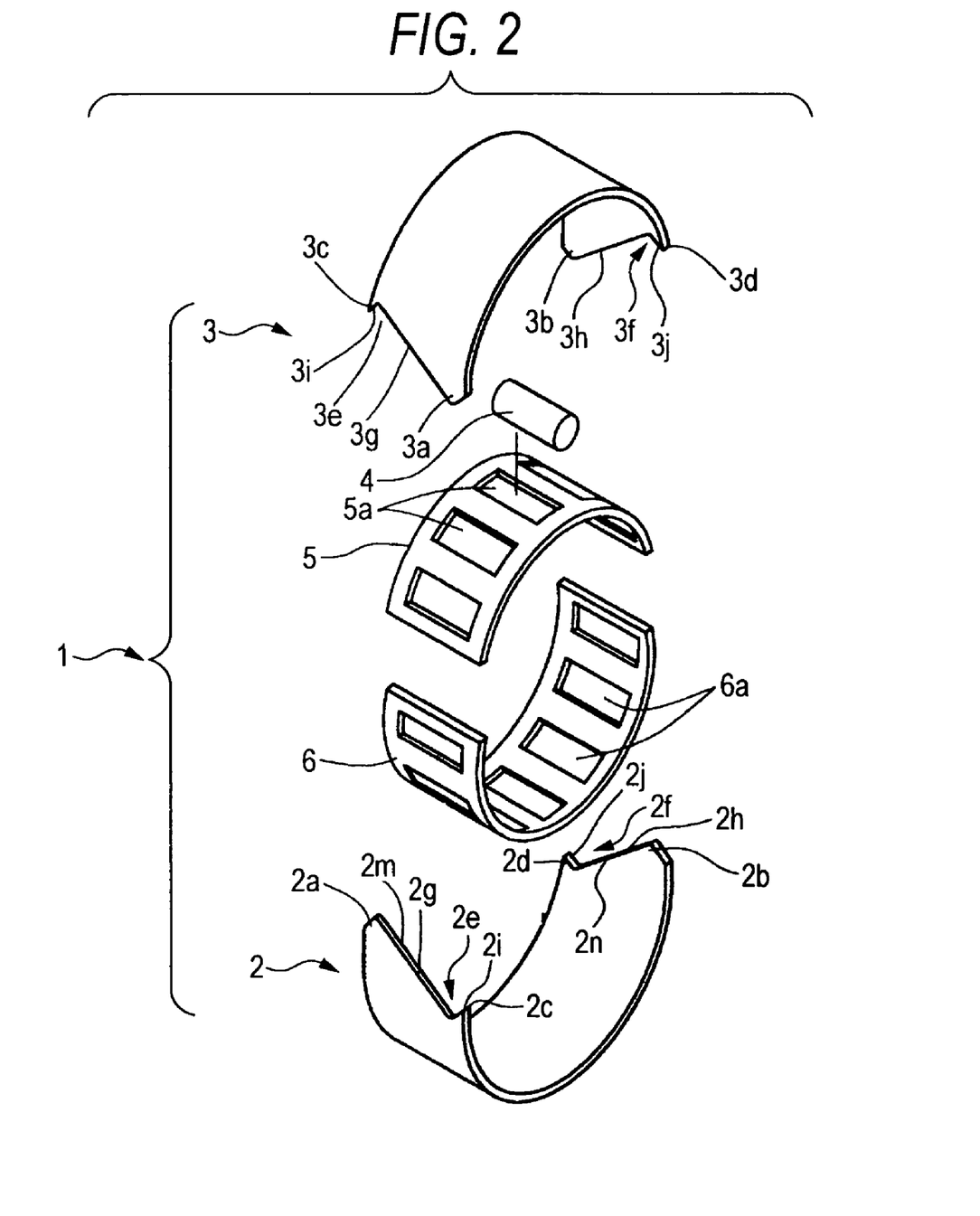
FIG. 2 is an exploded perspective view illustrating the split rolling bearing shown in FIG. 1.

The best mode for carrying the invention is described by being shown in the accompanying drawings. A split rolling bearing is described by referring to FIGS. 1 and 2. FIG. 1 is a side view illustrating a split rolling bearing. FIG. 2 is an exploded perspective view illustrating the split rolling bearing.

A rolling bearing 1 shown in the figures has paired split outer races 2 and 3, plural rollers 4 circumscribed on the inner surfaces of the paired split outer races 2 and 3, and paired split cages 5 and 6 for holding the rollers 4 arranged in such a way as to be substantially equally spaced in a circumferential direction thereof. The rollers 4 are inseparably accommodated in pockets 5a and 6a of the cages 5 and 6.

Figure 3:
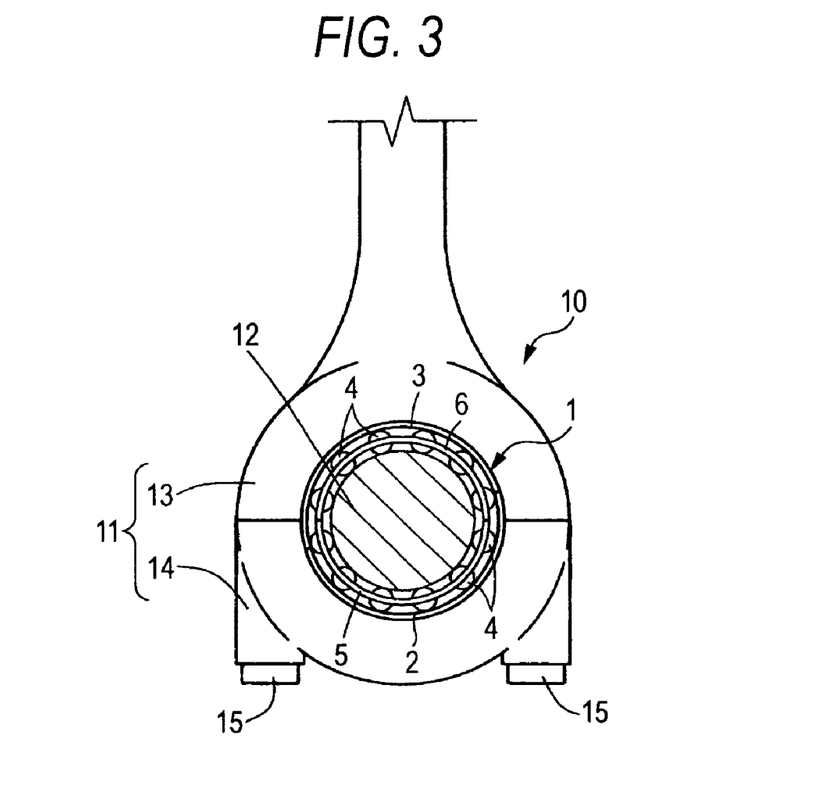
FIG. 3 is a front view illustrating a case where the split rolling bearing according to the invention is used at a large end part of a connecting rod.

The split rolling bearing 1 can be used in the connection portion between a crankshaft and a connecting rod of an automobile engine. Such a mode of use is described by being illustrated in FIG. 3. FIG. 3 is across-sectional view illustrating a state in which the split rolling bearing is incorporated into a large end of the connecting rod.

The connecting rod 10 has a large end part 11, which is supported by a crankshaft 12, and also has a small end part (not shown), to which a piston (not shown) is attached through a pin.

The large end part 11 has a structure in which a cross-sectionally substantially circular through-hole is formed by fastening and fixing a cross-sectionally substantially semi-circular cap part 14 to a cross-sectionally substantially semicircular body part 13 with bolts 15. The split rolling bearing 1 is incorporated into the substantially semicircular through-hole defined by this body part 13 and the cap part 14. In this example, the crankshaft 12 is an inner race member of the split rolling bearing 1.

Figure 4:
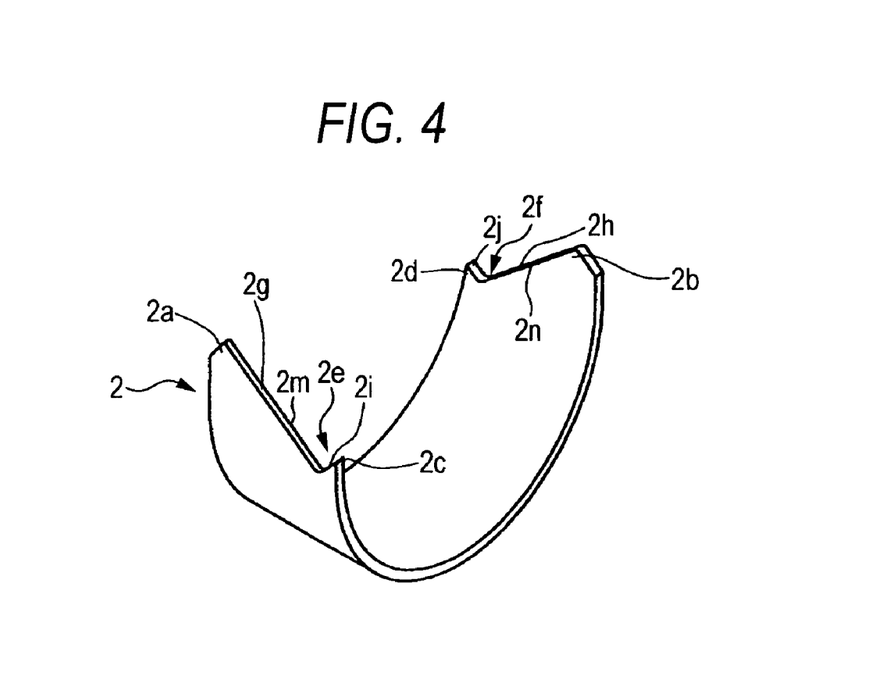
FIG. 4 is a perspective view illustrating a split outer race according to the invention.
Figure 5:
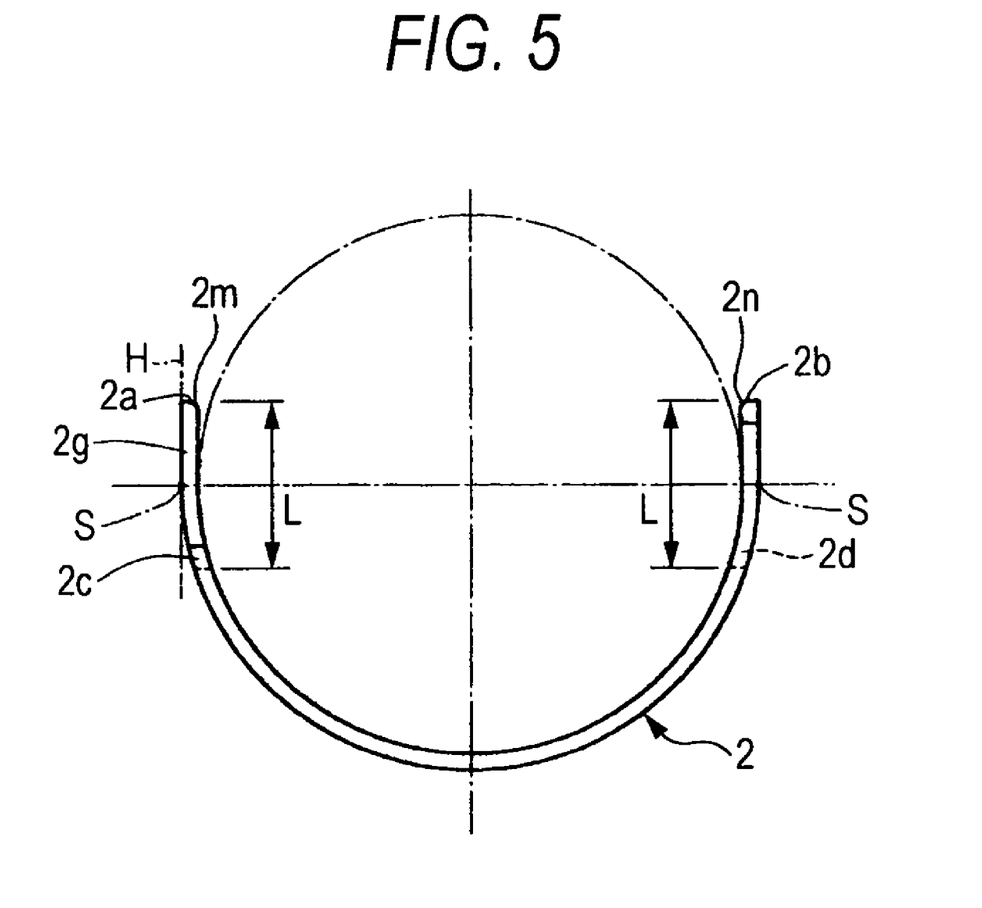
FIG. 5 is a side view illustrating the split outer race shown in FIG. 4.
Figure 6:
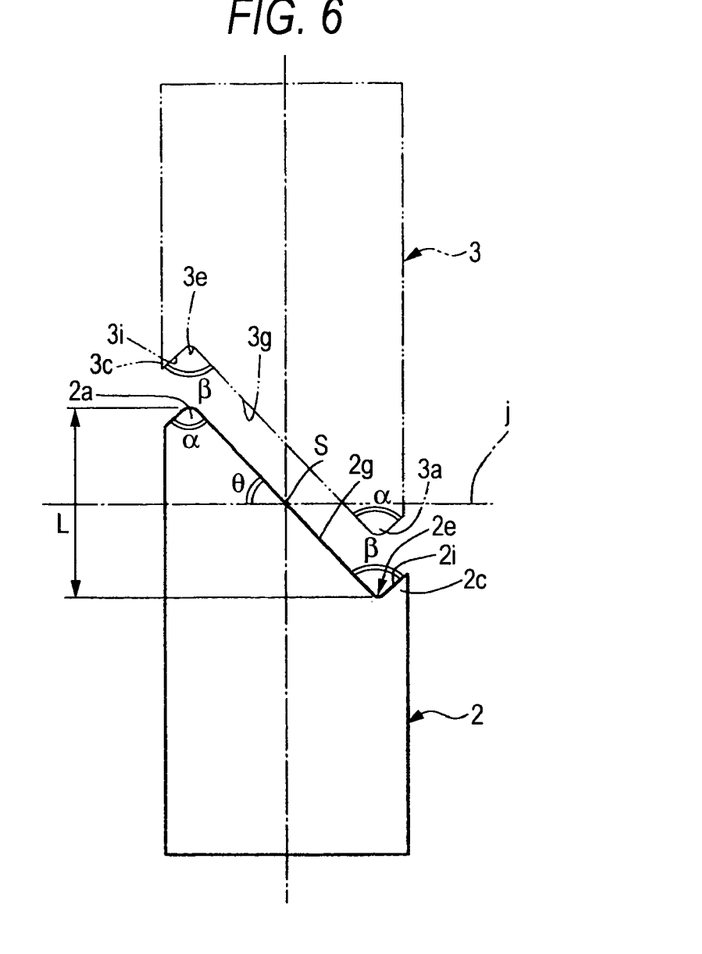
FIG. 6 is a plan view illustrating an end in a circumferential direction of the split outer race shown in FIG. 4.
Figure 7:
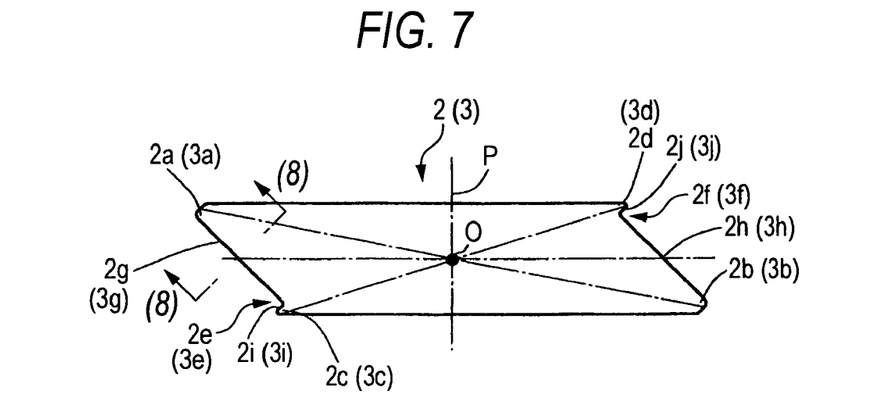
FIG. 7 is a plan development illustrating the split outer race shown in FIG. 4.
Figure 8:
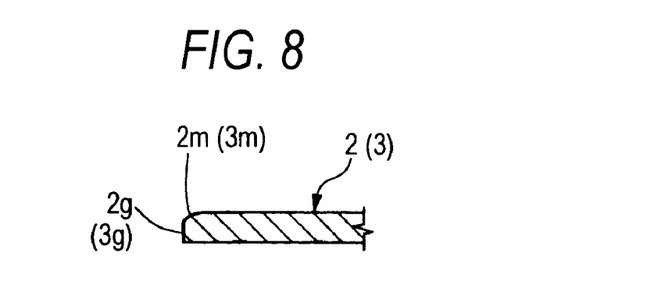
FIG. 8 is a cross-sectional view taken on line (8)-(8) in the direction of an arrow shown in FIG. 7.
Figure 9:
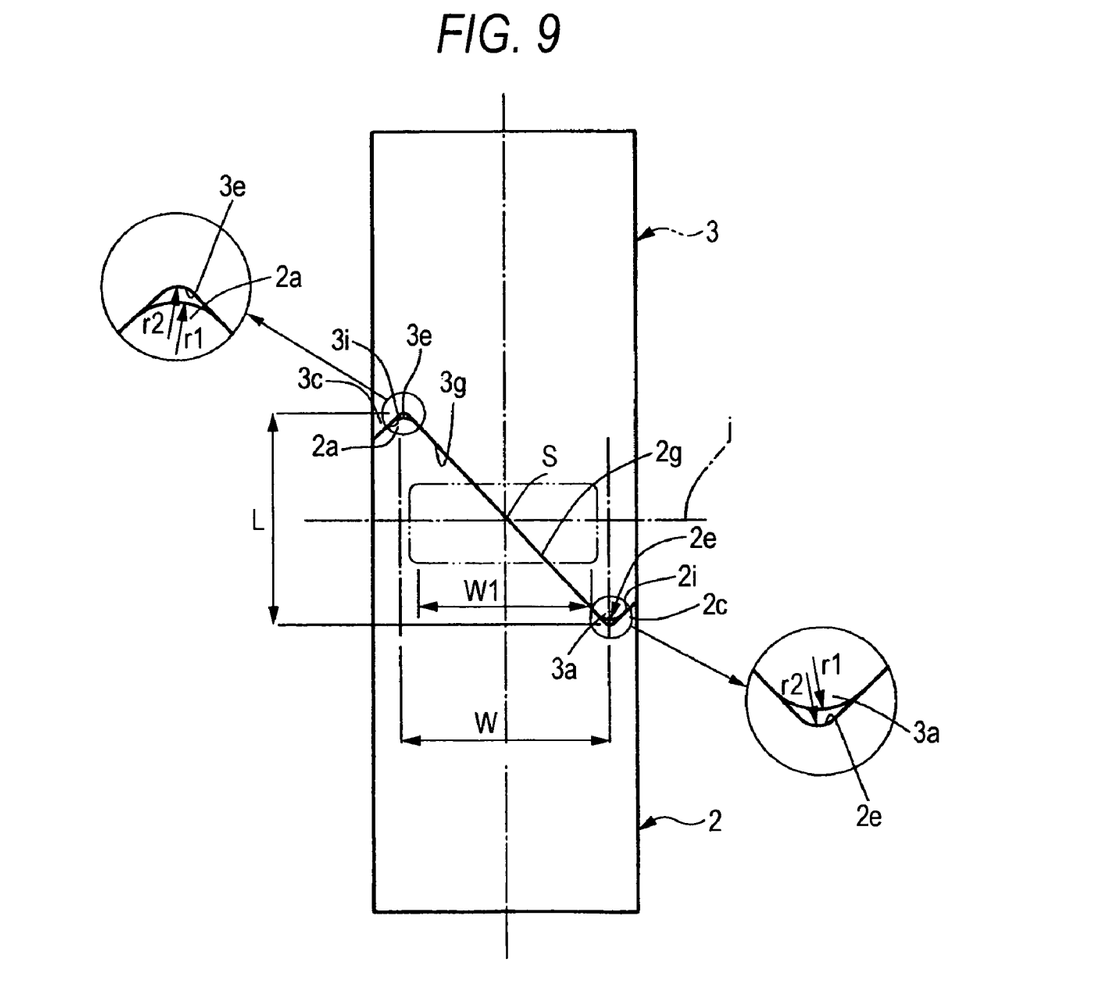
FIG. 9 is a detail explanatory view illustrating an abutting portion at which the two split outer races abut against each other.

Hereinafter, the split outer races 2 and 3 of the split rolling bearing 1 are described in detail by referring to FIGS. 4 to 9. FIG. 4 is a perspective view illustrating the split outer race. FIG. 5 is a side view illustrating the split outer race. FIG. 6 is a plan view illustrating an end in a circumferential direction of the split outer race. FIG. 7 is a plan development illustrating the split outer race. FIG. 8 is a cross-sectional view taken on line (8)-(8) in the direction of an arrow shown in FIG. 7. FIG. 9 is a detail explanatory view illustrating an abutting portion at which the two split outer races abut against each other.

Each of the split outer races 2 and 3 shown in the figures is formed by bending a strip-shaped metallic plate in such a way as to have a substantially semicircular cross-section. One end part and the other end part in the circumferential direction of each of the split outer races are formed in such a manner as to have concave-and-convex shapes so that one end part in the circumferential direction of each of the split outer races is fitted to the corresponding end part of the other split outer race.

Concretely, the outer shape of the plan development of the split outer races 2 and 3 is set to be a shape that is symmetric about a point O, for example, a substantially parallelogram in plan view.

A large convex part 2a (3a), 2b (3b), a small convex part 2c (3c), 2d (3d), and a concave part 2e (3e), 2f (3f) are arranged in an axial direction at an associated one of an end and the other end in a circumferential direction of the split outer race 2 (3). Each of slope portions 2g (3g), 2h (3h) is provided in such a way as to extend from an apex portion of the associated large convex part 2a (3a), 2b (3b) to the deepest portion of the associated concave part 2e (3e), 2f (3f). Also, each of slope portions 2i (3i), 2j (3j) is provided in such a manner as to extend from the deepest portion of the associated concave part 2e (3e), 2f (3f) to an apex of the associated small convex part 2c (3c), 2d (3d). The inclination of each of the slopes 2g (3g), 2h (3h) is opposite to that of the associated slope 2i (3i), 2j (3j). Preferably, an angle of inclination of the former slope portion 2g (3g), 2h (3h) with respect to a line J extending along the direction of an axis thereof is set to be equal to or more than 30 degrees and less than 90 degrees. This is because friction can be reduced during the rollers 4 pass therethrough.

Next, the details of the split outer races 2 and 3 are described hereinbelow.

(a) The edge portions 2m, 2n (3m, 3n) provided on the inner surfaces (that is, the raceway surfaces) at both end parts in the circumferential direction of the split outer races 2 (3) are rounded. In such a case, even when both ends in the circumferential direction of each of the paired split outer races 2, 3 are slightly displaced in a radial direction and step-like portions each corresponding to a slight height difference are formed during the paired split outer races 2, 3 are attached to the place of use, the rollers 4 abut against the rounded edge portions 2m, 2n, 3m, 3n at both ends in the circumferential direction of the split outer races 2, 3. Thus, an amount, by which the roller 4 rides on the step-like portion, is reduced, so that the generation of vibrations and noises are suppressed.

(b) Let S denote a midpoint of a part, which extends from an apex of the large convex part 2a (3a), 2b (3b) to the deepest portion of the concave part 2e (3e), 2f (3f) and has a length L in a circumferential direction. A region extending from this midpoint S to the apex of the large convex part 2a (3a), 2b (3b) is shaped in such a way as to extend substantially straight along a tangential line H at the midpoint S. A region extending from this midpoint S to the deepest portion of the concave part 2e (3e), 2f (3f) is shaped in such a way as to extends along a circular arc contour of the entire split outer race 2 (3). Incidentally, this part, which is shaped in such a way as to extend along the circular arc, and the part, which extends substantially straight, are continuously connected to each other. Thus, when the split outer race 2 (3) is singly present, a part extending from the large convex part 2a (3a), 2b (3b) to the small convex part 2c (3c), 2d (3d) is slightly twisted. A part extending from the midpoint S at the one-end side to the midpoint S at the other-end side is cross-sectionally semicircular-shaped. A region extending from the midpoint S to the apex of each of the large convex part 2a (3a), 2b (3b) protrudes in the circumferential direction from the cross-sectionally semi-circular-shaped part. In this case, in a condition in which the paired split outer races 2(3) are attached in combination to the place of use, the substantially straight portion provided at the side of the end of each of the large convex parts 2a (3a), 2b (3b) is elastically deformed according to the counterpart fitting surface. The elastic restoring force of this elastically deformed portion pushes each of both the split outer races 2, 3 closely against the counterpart fitting surface without any clearance therebetween. Consequently, the backlash of both the split outer races 2, 3 can be eliminated. Thus, the inner surfaces of both the split outer races 2, 3 are cross-sectionally substantially perfect-circle-shaped.

(c) An central angle α of each of the large convex parts 2a (3a), 2b (3b) is set to be equal to that β of the concave parts 2e (3e), 2f (3f). Moreover, the relation between the curvature radius r1 of the apex portion of the large convex part 2a (3a), 2b (3b) and the curvature radius r2 is set by the following inequality: r1>r2. In such a case, each of the apex portions of the large convex parts 2a (3a), 2b (3b) does not interfere with the deepest portion of the associated concave part 2e (3e), 2f (3f). Thus, in a state in which the paired split outer races 2 (3) are attached in combination to the place of use, both ends in the circumferential direction of each of the split outer races 2, 3 can be made to closely abut against both ends in the circumferential direction of the other split outer race 3, 2. This is advantageous in increasing the roundness of a circular cross-section formed by both the split outer races 2, 3.

(d) Both end surfaces in the circumferential direction of the split outer races 2 (3) are set to be rough surfaces having minute asperity. In this case, in a state in which the paired split outer races 2 (3) are attached in combination to the place of use, the minute asperity of each of the both end surfaces of both the split outer races 2, 3 is eliminated. Thus, the split outer races 2, 3 closely abut against each other. Consequently, clearance between the slip outer races is difficult to produce.

(e) An axial separation distance W from the apex portion of each of the large convex parts 2a (3a), 2b (3b) to the deepest portion of the associated concave part 2e (3e), 2f (3f) is set to be larger than the effective raceway length W1 of the roller 4. In this case, in a state in which the paired split outer races 2 (3) are attached in combination to the place of use, the apex portions of the large convex parts 2a (3a), 2b (3b), and the deepest portions of the concave parts 2e (3e), 2f (3f) are not used as roller raceway surfaces. Thus, the rolling of the rollers 4 is smoothed.

Figure 10:
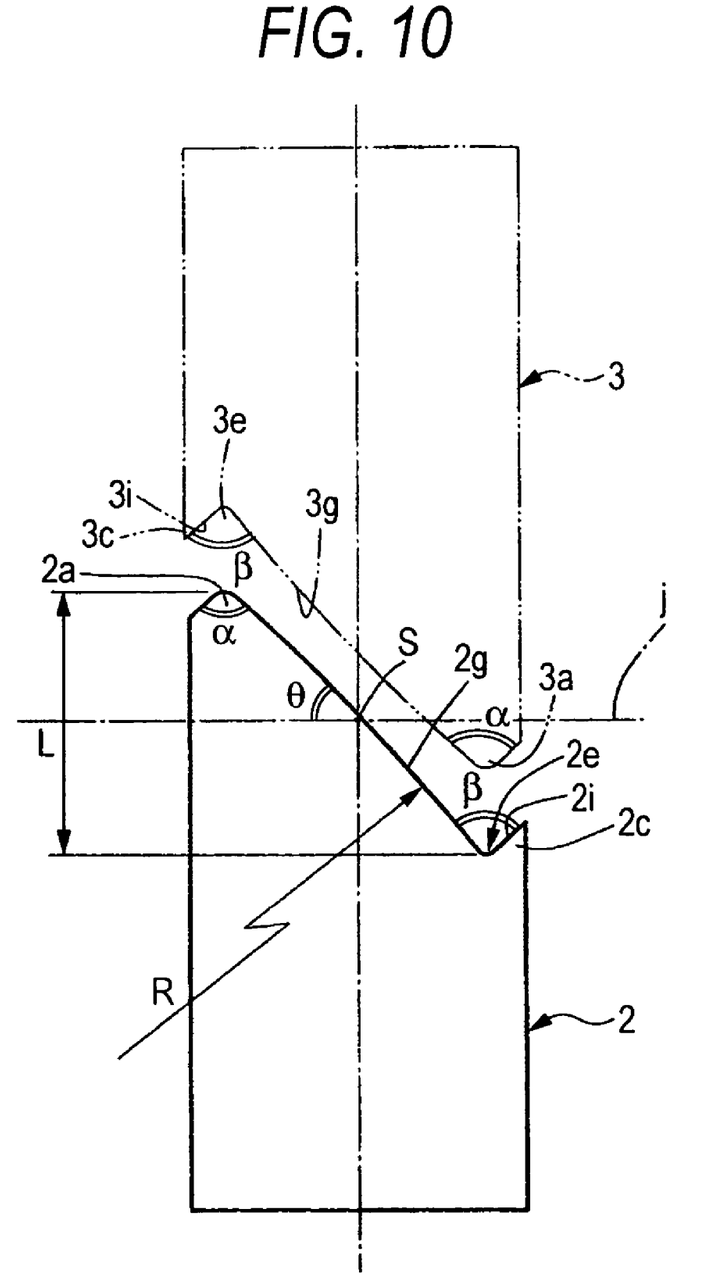
FIG. 10 is a view illustrating an example in which full crowning is performed on a slope portion shown in FIG. 9.

(f) As shown in, for example, FIG. 10, full-crowning is performed on the slope portions 2g, 2h (3g, 3h). That is, the shapes of the slope portions 2g, 2h (3g, 3h) are set to be convex curved shapes whose apex is located at the substantially central position in the entire length range thereof. As illustrated in the figure, this convex curved shape can be formed by using a single curvature radius R. Additionally, a logarithmic curve may be employed as a convex curve. In this case, in a state in which the paired split outer races 2 (3) are attached in combination to the place of use, the apex parts of the slope portions 2g, 2h, 3g, 3h, and abutting regions, each of which extends from the apex to both sides in the axial direction and has a predetermined width, abut against one another at the abutting portion at which the both end surfaces in the circumferential direction abut against each other. Regarding other regions, slight clearances are formed at the abutting portion. A middle part in the axis of rotation of each of the rollers 4 rolls the abutting region. Consequently, the rolling of the roller 4 is smoothed.

Meanwhile, among the structures described in the items (a) to (f), preferably, the structures described in the items (a) and (b) are employed as indispensable ones of embodiments of the invention. However, embodiments may be obtained by comprising at least one of the structures described in the items (c) to (f).

In the case of employing such split outer races 2 (3), when the paired outer races are attached in combination to the large end part 11 of the connecting rod 10, both ends in the circumferential direction of the split outer race 2 substantially coincides with and are fitted to those in the circumferential direction of the split outer race 3, so that the split outer races are not deviated in the axial direction and in the radial direction from each other. Thus, the inner peripheral surfaces of both the split outer races 2, 3 are cross-sectionally shaped into a substantially perfect circle without step-like parts. Consequently, the rollers 4 can stably roll on the inner peripheral surfaces of the paired split outer races 2, 3, so that the generation of vibrations and noises can be suppressed or prevented. This contributes to an increased bearing life.

Figure 11:
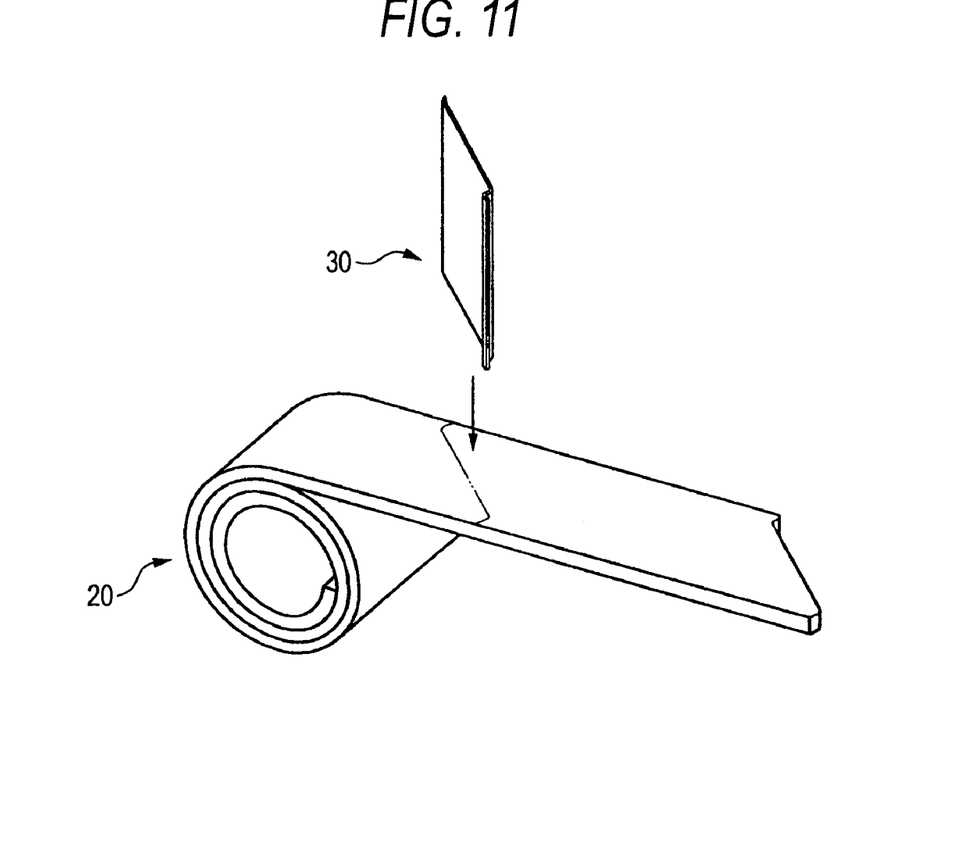
FIG. 11 is a view illustrating a method of manufacturing the split outer race shown in FIG. 4.

A method of manufacturing the split outer race 2 (3) is described hereinbelow by referring to FIGS. 11 and 12.

First, a blank material 21 is obtained by using a hoop member 20 and cutting the hoop member 20 every predetermined length through the use of a punching tool. The hoop member 20 may be an appropriate metallic member, such as SCM415 and SPCC according to JIS. A cut section of this blank material 21 has a nonlinear shape, as shown in FIGS. 4 to 6.

Figure 12:
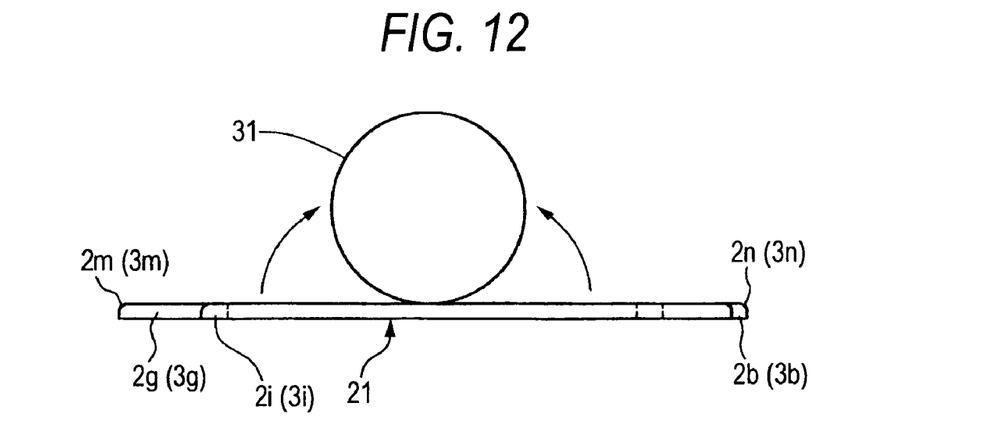
FIG. 12 is a view illustrating the rest of the method illustrated in FIG. 11.

Subsequently, as illustrated in FIG. 12, the blank material 21 is held against a cylindrical receiving mold 31. Then, the blank material 21 is bent like a substantially semicircle by using an appropriate bending tool (not shown). At this bending, the large convex parts 2a, 2b (3a, 3b) provided at both ends in the circumferential direction are placed to the outside-diameter side from the outer surface of the mold.

An appropriate hardening heat treatment, such as carburizing, carbonitriding, quenching and tempering, is performed on the inner surface (serving as the raceway surface of the rollers 4) the split outer race 2 (3) obtained by being processed in this way. Subsequently, appropriate surface finishing is performed thereon. Coating processes, such as barrel coating, shot coating, PTFE coating, molybdenum coating, and diamond-like carbon coating, may be performed thereon.

Meanwhile, when the hoop member 20 is cut by the punching tool 30, an edge portion at upstream side in a cutting direction of a cut end of the blank material 21 can be rounded. Thus, simultaneously with the cutting, the rounded edge portions 2m, 2n (3m, 3n) described in the item (a) can be obtained. Consequently, the number of steps can be reduced. This contributes to the reduced cost. Incidentally, another method of rounding the edge portions 2m, 2n (3m, 3n) is to cause the plastic deformation of the blank member by using a press die. Additionally, at the cutting, the minute asperity as described in the item (d) can be obtained by breaking a downstream part in the cutting direction of the cut end of the blank material 21.

Further, in the bending step, both ends in the circumferential direction of the blank material 21 is not completely bent to thereby obtain the shape as described in the item (b).

Moreover, the shapes described in the items (c), (e), (f) can be obtained according to the tooth shape of the punching tool 30.

According to the aforementioned manufacturing method, the shapes of both ends in the circumferential direction of the split outer races 2, 3 can easily be formed with high precision. Thus, manufacturing yield can be enhanced, while the cost can be reduced. Both sides of the hoop member 20 have smooth surfaces without being abraded. The rollers 4 smoothly roll on the inner surfaces obtained by curving the smooth surfaces. This is advantageous in suppressing the generation of vibrations and noises.

Hereinafter, other embodiments of the invention are described hereinbelow.

Figure 13:
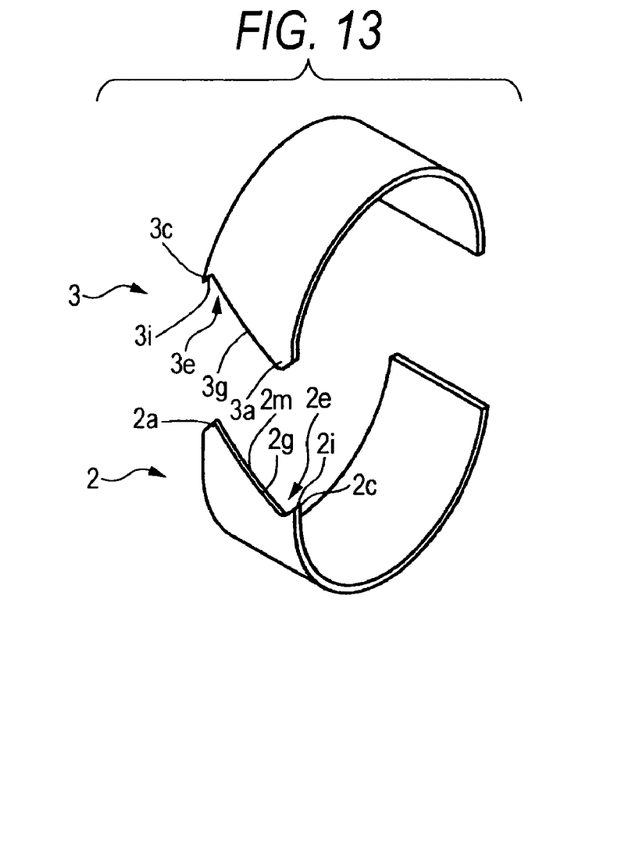
FIG. 13 is a perspective view illustrating a split outer race according to another embodiment of the invention.

(1) As shown in FIG. 13, an end part or the other end part in the circumferential direction of each of the split outer races 2, 3 may be shaped like a straight part extending along an axial direction.

Figure 14:
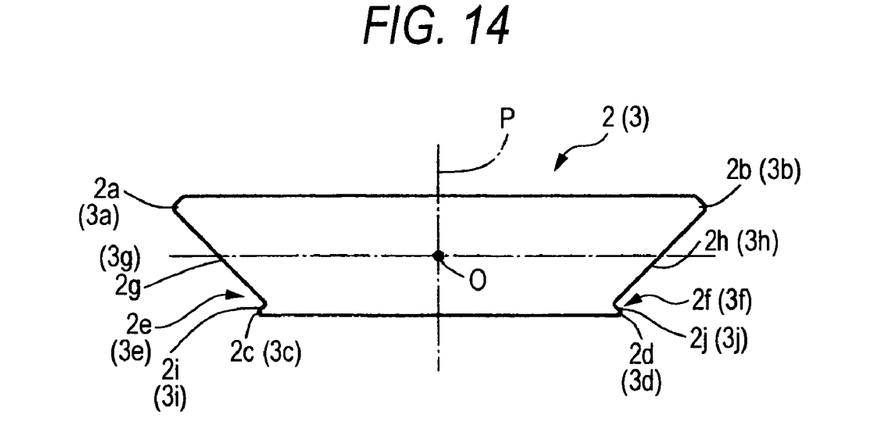
FIG. 14 is a plan development illustrating a split outer race according to another embodiment of the invention.
Figure 15:
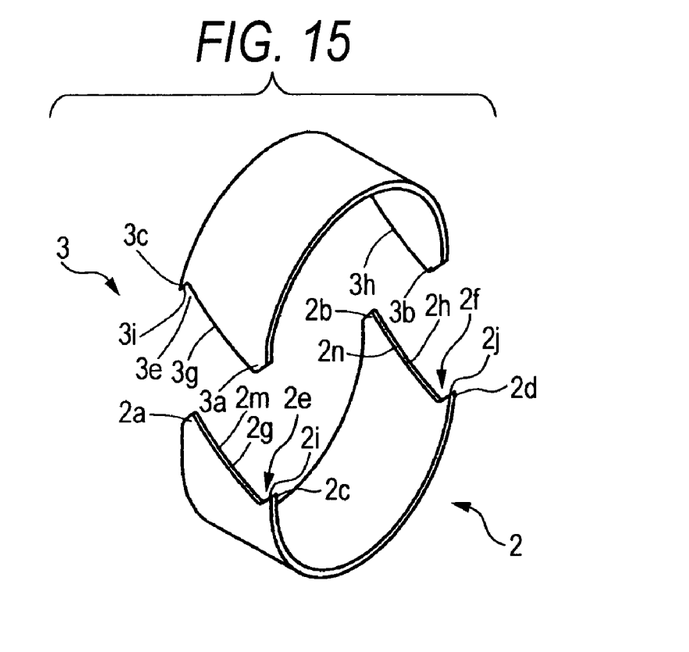
FIG. 15 is a perspective view illustrating a split outer race according to another embodiment of the invention.

(2) As shown in FIG. 14, the outer shape of the split outer race 2 (3) extended like a strip is set to be axisymmetrical with respect to a line P, which passes through the center O in the longitudinal direction thereof and extends in the transverse direction thereof and serves as an axis of symmetry, for example, set to be a substantially trapezoid in plan view. In this case, it is necessary to manufacture the paired split outer races so that the direction of bending one of the split outer races 2, 3 from the condition, in which the split outer races are extended like a strip as shown in FIG. 14, is opposite to the direction of bending the other split outer race 3, 2 as shown in FIG. 15.

Figure 16:
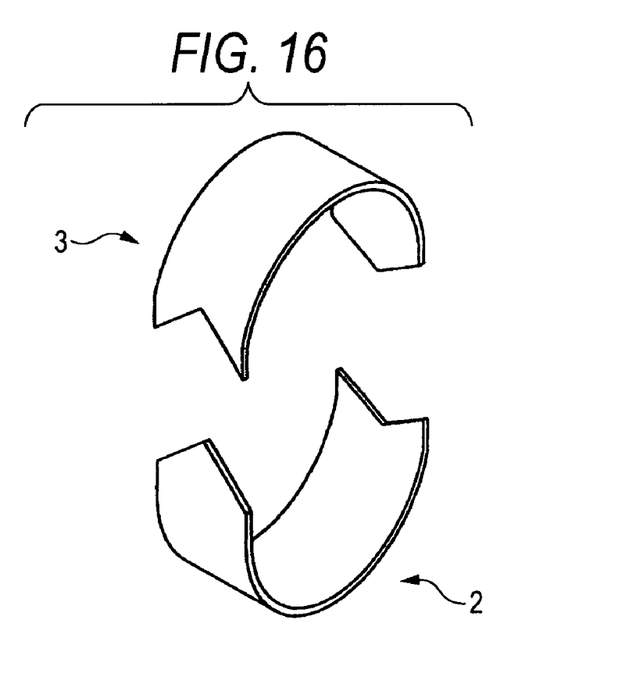
FIG. 16 is a perspective view illustrating a split outer race according to another embodiment of the invention.
Figure 17:
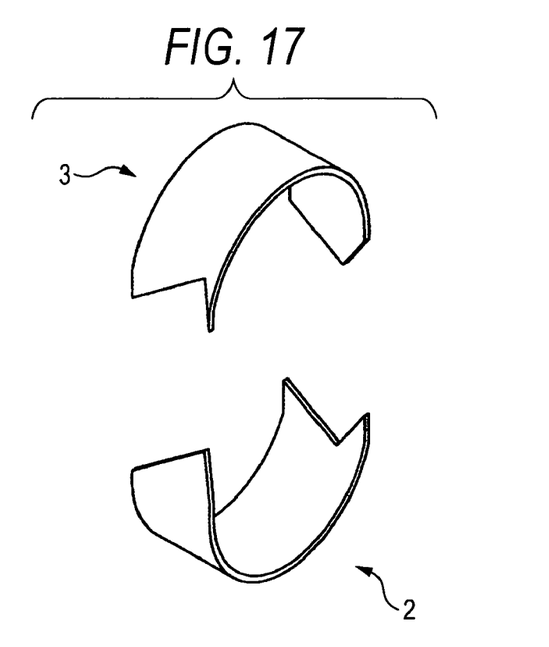
FIG. 17 is a perspective view illustrating a split outer race according to another embodiment of the invention.
Figure 18:
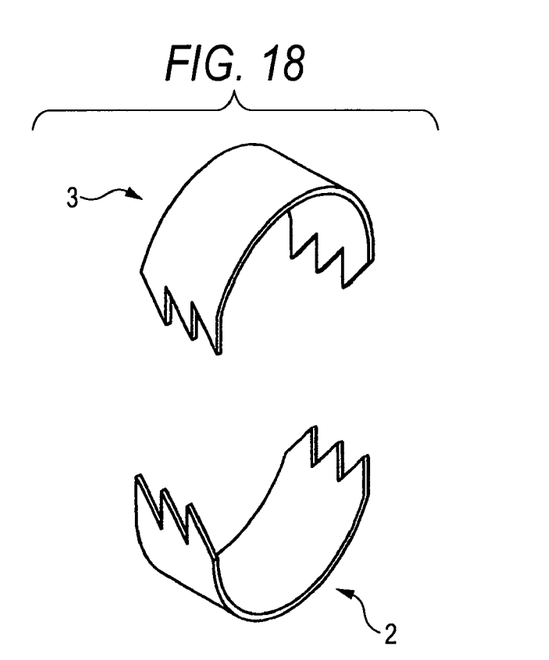
FIG. 18 is a perspective view illustrating a split outer race according to another embodiment of the invention.

(3) As long as the shape of each of both ends of the split outer races 2, 3 has at least one set of a convex part and a concave part, the shape of each of both ends of the split outer races 2, 3 is not limited to a specific shape. Examples of the shapes of both ends in the circumferential direction of each of the split outer races 2, 3 are as follows. That is, as shown in FIG. 16, one end in the circumferential direction is convex V-shaped, while the other end in the circumferential direction is concave V-shaped. Alternatively, as shown in FIG. 17, the apex portion of the convex V-shaped end part, and the deepest portion of the concave V-shaped end part are offset toward one side in the axial direction. Alternatively, as shown in FIG. 18, both the ends in the circumferential direction may be serrated. In each of theses cases, the split outer race has at least two slope portions inclined in opposite directions. Moreover, in each of these cases, the split outer race has the structures described in the items (a) and (b). Additionally, preferably, the split outer race may have at least one of the structures described in the items (c) to (f).

The invention claimed is:

1. A split outer race for use in a rolling bearing, wherein the split outer race is formed by bending a strip-shaped metallic plate into a substantially semicircle shape;
at least one end of the split outer race in a circumferential direction has a concave-and-convex shape including a first slope portion which is inclined to an axial direction and a second slope portion inclined in a direction opposite to a direction in which the first slope portion is inclined; and
an edge portion formed on an inner surface of the one end in the circumferential direction has a round shape.

2. The split outer race according to claim 1, wherein the concave-and-convex shape includes a convex part projected in the circumferential direction and a concave part recessed in the circumferential direction,
the first slope portion is defined by a part extending from an apex portion of the convex part to a deepest portion of the concave part, and
the second slope portion is defined by a part extending from the deepest portion of the concave part to a portion provided at a side opposite to the convex part.

3. The split outer race according to claim 2, wherein the convex part is projected in the circumferential direction so that a length of a circular arc of the single split outer race is longer than a circumference of the semicircle shape; and
the portion projected from the convex part is placed to an outer diameter side being outer than an outer surface of a semicircular-shaped part.

4. The split outer race according to claim 2, wherein a center of the first slope portion in a width direction is located substantially at a center of the strip-shaped metallic plate in a width direction,
a pair of the second slope portions are formed at opposite sides of the first slope portion, and
the second slope portions are extended to opposite ends of the strip-shaped metallic plate in a width direction, respectively.

* * * * *